United States Patent [19]

Debons et al.

[11] Patent Number: 4,822,501

[45] Date of Patent: Apr. 18, 1989

[54] USE OF LIGNIN/AMINE/SURFACTANT BLENDS IN ENHANCED OIL RECOVERY

[76] Inventors: Francis E. Debons, 2435 Wren Meadow, Richmond, Tex. 77469; Larry D. Pedersen, 6875 Farley Rd., Pinckney, Mich. 48169; Lawrence E. Whittington, 25902 Hunter La., Katy, Tex. 77450

[21] Appl. No.: 59,561

[22] Filed: Jun. 5, 1987

Related U.S. Application Data

[63] Continuation-in-part of Ser. No. 727,098, Apr. 25, 1985, abandoned, which is a continuation-in-part of Ser. No. 481,950, Apr. 4, 1983, abandoned.

[51] Int. Cl.$^4$ .............................................. E21B 43/22
[52] U.S. Cl. .................................. 252/8.554; 166/274; 166/275
[58] Field of Search ...................... 252/8.554; 166/275, 166/274

[56] References Cited

U.S. PATENT DOCUMENTS

| | | | |
|---|---|---|---|
| 1,823,440 | 9/1931 | De Groote et al. | 252/8.554 |
| 3,307,628 | 3/1967 | Sena | 166/275 |
| 3,373,809 | 3/1968 | Cooke | 166/275 X |
| 3,500,912 | 3/1970 | Davis et al. | 166/275 |
| 3,515,214 | 6/1970 | Finch | 166/274 X |
| 4,079,785 | 3/1978 | Hessert et al. | 252/8.554 X |
| 4,133,385 | 1/1979 | Kalfoglou | 252/8.554 X |
| 4,434,062 | 2/1984 | Oswald et al. | 252/8.554 |

OTHER PUBLICATIONS

Chiwetelu et al, article in Journal of Canadian Petroleum Technology, Jul.-Sep. 1980, pp. 91-99.

*Primary Examiner*—Herbert B. Guynn
*Attorney, Agent, or Firm*—Arnold, White & Durkee

[57] ABSTRACT

A method for the enhanced recovery of oil comprised of injecting into an oil containing formation an aqueous surfactant system comprised of a blend of an oil soluble amine, a lignin selected from the group consisting of lignosulfonates and sulfonated alkali and soda lignins, and a water soluble anionic or non-ionic surfactant and water; driving the surfactant system through the formation and producing the oil mobilized by the surfactant system. A surfactant composition useful for enhanced oil recovery methods comprised of an oil soluble amine, a lignin, and a water soluble anionic or non-ionic surfactant.

15 Claims, No Drawings ent. The correct combination
USE OF LIGNIN/AMINE/SURFACTANT BLENDS IN ENHANCED OIL RECOVERY This application is a continuation-in-part of application Ser. No. 727,098, filed Apr. 25, 1985, which is a continuation-in-part of application Ser. No. 481,950, filed Apr. 4, 1983, both now abandoned.

FIELD OF THE INVENTION

The present invention is directed to methods of enhanced oil recovery and to compositions useful therein.

BACKGROUND OF THE INVENTION

Petroleum is produced from subterranean formations through wells penetrating the formation. Initially, natural reservoir pressure may be sufficient to cause the oil to flow to the surface. As natural reservoir pressure declines due to production from the reservoir, various forms of artificial lift may be employed to bring to the surface the oil which flows into the well bores. This phase of production is usually termed primary.

Typically, during the primary production period of a reservoir, only 10 to 30% of the oil initially in place may be economically recovered. As the production rate from a reservoir falls near the level at which it is no longer economic to operate the field, active steps, usually termed secondary, are taken to increase recovery. In some instances, secondary recovery techniques may be employed from the time of initial production from a reservoir to optimize recovery.

The most common form of secondary recovery is the process known as waterflooding. In a waterflood project, water is injected into the oil producing formation through injection wells, repressurizing the formation and sweeping oil which would not have otherwise been produced into production wells. Such a procedure will usually allow the economic production of an additional 10 to 30% of the oil originally in place.

As is readily seen, a reservoir may have as much as 80% of the original oil in place still unproduced after primary and secondary operations have terminated. The increasing scarcity of crude oil and its rising price have led to the development of various techniques intended to allow further production from reservoirs which have been depleted by primary and secondary operations. These operations aimed at enhanced oil recovery (EOR) from conventionally depleted reservoirs are generally termed tertiary.

Among the most promising of tertiary recovery methods are processes wherein a solution of surfactants is injected into the reservoir. The surfactant solution mobilizes the oil remaining in place after conventional production and allows it to be swept into production wells.

To date, most enhanced oil recovery surfactant systems have used a petroleum sulfonate or a blend of two or more petroleum sulfonates. Typically, the average equivalent weight of a petroleum sulfonate or the blend of petroleum sulfonates useful in enhanced oil recovery operations is about 400. A common technique is to use a blend of a water soluble petroleum sulfonate and an oil soluble petroleum sulfonate. The correct combination of the two petroleum sulfonates yields a stable micellar solution which lowers the interfacial tension between the crude oil and surfactant solution and is capable of mobilizing the residual oil in the formation. This form of chemical or surfactant flooding is called low tension flooding.

Another form of chemical or surfactant flooding utilizing petroleum sulfonates employes a phase partitioning surfactant system. Such a system operates through the formation of a middle phase microemulsion comprised of both the surfactant and crude oil. Phase partitioning surfactant systems generally require higher surfactant concentrations than low tension systems and a cosolvent such as $C_4$ to $C_6$ alcohol. In these systems, the surfactant is often a combination of an oil soluble and a water soluble petroleum sulfonate with an average equivalent weight of 380–440.

A combination of increased interest in enhanced oil recovery due to decreasing crude oil supplies and the scarcity and escalating cost of surfactants has generated research into non-conventional surfactants. Among such surfactants, derivatives of lignin, a phenylpropane polymer which comprises about 10 to 30% of wood, have attracted the attention of researchers for a number of years. As early as 1931, U.S. Pat. No. 1,823,440 issued disclosing a method of enhanced oil recovery involving the use of wood sulfite liquor. More recently, lignin sulfonates have been disclosed as sacrificial agents used to inhibit the deposition of the more costly petroleum sulfonates on the formation. See e.g., U.S. Pat. No. 4,006,779. The present invention is a method which allows a significant portion of the expensive petroleum sulfonate in a chemical flood to be replaced with an inexpensive non-petroleum based surfactant while still retaining comparable oil recovery efficiency.

SUMMARY OF THE INVENTION

The invention is directed to a method and to compositions useful for the enhanced recovery of oil from a subterranean formation having at least one injection well and at least one production well. A surfactant system comprised of a water soluble anionic or non-ionic surfactant, an oil soluble organic amine, a lignin and water is injected into the producing formation. The surfactant system is then driven through the formation toward the producing well. The oil mobilized by the advancing surfactant system is produced through the production well.

DETAILED DESCRIPTION

Preparation of Stable, Active Ternary Blends

The combination of water soluble lignins and water soluble anionic or non-ionic surfactants with an oil soluble organic amine is novel for use in enhanced oil recovery. The amines employed are generally fatty amines which are very insoluble in water and tend to precipitate when water is added. However, under the proper conditions, the amines can be dissolved in water which contains a surfactant such as a petroleum sulfonate or a petroleum sulfonate/lignin combination.

One mixing procedure is to combine the amine and the lignin and to add brine which has been preheated to a temperature above the melting point of the amine. In the case of tallow amine, a temperature of 60°–70° C. is adequate. This combination of lignin, amine and brine is stirred at about 70° C. for about one hour. (In all cases tested, the resulting mixture was phase unstable and an oily precipitate was deposited if the solution was allowed to cool.) The water soluble surfactant is then weighed directly into the warm, unstable brine solution. After an additional one to three hours of stirring at about 70° C., the solution is allowed to cool. Example 1 details the above process.

The preferred mixing procedure, which also gives stable solutions, requires a thorough preblending of an aqueous lignin concentrate and an amine. When the proper ratios of lignin to amine are employed and the proper mixing conditions are used, a thick, stable slurry or paste is produced. Proper mixing involves warming the mixture of a temperature above the melting point of the amine and stirring slowly until the mixture becomes homogenous. This preblended lignin and amine can then be weighed or metered as though it were a single component. It can be combined with the anionic or non-ionic surfactant and brine which has not been preheated. The entire formulation is then mixed to obtain the surfactant solution useful in enhanced oil recovery. Example 2 describes the preferred mixing procedure.

When the ratio and total concentration of lignin, anionic or non-ionic surfactant, and amine are correct, a stable solution results. Generally, too much amine (higher than 20% of the mixture) or too little anionic or non-ionic surfactant (lower than 20% of the mixture) will cause precipitation of the surfactant within 24 hours. The stable solutions usually remain as a single phase indefinitely once they have remained stable for 24 hours. Solution as used herein is intended to include stable dispersions and emulsions as well as classical solutions. While phase stability is preferred, blends which are phase unstable can be used in enhanced oil recovery systems.

Stability, as discussed here, is dependent upon the salinity of the water used. The brine used here is a combination of 20% of a simulated oil field brine and 80% of a simulated fresh water. The water analyses are shown in Table 1. The blend used here has about 7,000 ppm total dissolved solids and contains some divalent cations ($Ca^{+2}$ and $Mg^{+2}$). At high ratios of brine to fresh water, the observed range of stability decreases and phase unstable solutions result.

TABLE 1

WATER ANALYSIS

| | Concentration, ppm | |
|---|---|---|
| | Brine | Fresh Water |
| $Na^+$ | 13,000 | 18 |
| $Ca^{+2}$ | 340 | 74 |
| $Mg^{+2}$ | 300 | 17 |
| $Cl^-$ | 19,650 | 130 |
| $SO_4^{-2}$ | 2,400 | 105 |
| Total Dissolved Solids | 35,000 | 344 |

A wide range of non-ionic or anionic water soluble surfactants can be used. Among the anionic surfactants useful in the invention are: petroleum sulfonates, alkoxylated alkyl sulfonates or sulfates, alkoxylated alkylaryl sulfonates or sulfates, alkylsulfonates, and alkylaryl sulfonates. These anionic surfactants can be neutralized with a variety of cations including sodium, potassium, ammonium, magnesium, calcium, alkyl amines and alkoxyamines. Other anionic surfactants such as phosphates can also be used. The non-ionic surfactants useful in the invention include polyglycol ethers, alkoxylated alcohols, alkoxylated carboxylic acids, alkoxylated alkyl phenols, alkoxylated amines, amides and esters of alkoxylates. The preferred surfactants are water soluble petroleum sulfonates.

Examples of useful oil soluble organic amines include alkyl amines and aryl amines having from 6 to 66 carbon atoms. Amines soluble in common organic solvents such as toluene, benzene, xylene, perchloroethylene, chloroform, butanol and amyl alcohol are suitable. Primary, secondary, tertiary and quaternary amines can be used in the surfactant systems claimed here. Especially preferred are $C_{16}$ to $C_{22}$ primary fatty amines.

Lignins which may be used in the present invention include lignosulfonates and oxidized or sulfonated alkali lignins and soda lignins. Lignosulfonates and lignosulfonic acids are obtained by cooking wood chips at high temperature in the presence of sulfite ion under acid, neutral, or alkaline conditions. The most common process uses a solution or liquor comprised of sulfurous acid and sodium bisulfite. The lignosulfonates and raw spent sulfite liquors useful in this invention may be neutralized with sodium, magnesium, calcium, ammonium, or other cations. These lignins can be derived from hardwoods or softwoods or from other sources. They may have undergone further processing to remove sugars and other carbohydrates either chemically or by fermentation. They may have undergone further processing to reduce the molecular weight or desulfonate the lignin. For example, the products obtained by cooking a lignin solution with sulfite ion in an alkaline medium at 100° to 200° C. for ¼ to 48 hours are useful for the instant invention. Alkali lignins, also known as Kraft lignins or thiolignins, are obtained by cooking wood chips at high temperature in a caustic solution of sodium sulfide. Soda lignins are obtained by cooking wood chips in a caustic solution only. These alkali and soda lignins are then processed to render them water soluble at neutral pH. Useful lignins can also be obtained by sulfite or alkali or soda processes which are catalysts or accelerators such as anthraquinone or hydroanthraquinone. For the purposes of this description and the claims of this invention, the term "lignin" will be used to describe lignosulfonates and alkali and soda lignins treated so as to render them water soluble at neutral pH. Sulfite lignins are the preferred lignins for use in this invention.

EXAMPLE 1

In a small mixing bottle were combined 0.1 g of tallow amine (Adogen 170, Sherex Chemical Company) and 1.22 g of a 40.9% solids softwood lignosulfonate (Norlig 82, American Can Company). To this mixture was added 95.22 g of warm (60°–70° C.) 20% brine/80% fresh water. The bottle was capped and the contents were warmed to 60°–70° C. on a hotplate/stirrer and stirred for approximately one hour. To the non-homogeneous mixture was added 3.46 g of a 40.5% active petroleum sulfonate (TRS-40, Witco Chemical Company, average equivalent weight of 340). The resulting solution, which contained 0.1% tallow amine, 0.5% lignosulfonate (as total solids) and 1.4% anionic surfactant, was heated and stirred for an additional 2–3 hours.

Other compositions were mixed in a similar manner, with the total concentration remaining at 2% on an active weight/weight basis. "Activity" for a spent sulfite liquor was considered to be total solids, not lignin solids.

EXAMPLE 2

A lignin amine concentrate was prepared as follows: The softwood lignosulfonate Norlig 82 (American Can Company) 169.15 g of a 44.34% total solids product or 75 g of solids was combined with 25 g of tallow amine, Adogen 170 (Sherex Chemical Company). The mixture was heated to 70° C. and stirred at a moderate speed with an overhead stirrer. After one hour at 70° C., the mixture was allowed to cool, while stirring for another seven hours.

The thick black product (53.3% solids) was used to prepare a surfactant as follows: The petroleum sulfonate TRS-40 (Witco Chemical Company), 3.21 g, and the lignin amine product, 1.31 g, were combined in a jar with 95.48 g of a 20% brine/80% fresh water mixture (see Table 1). The mixture was heated to about 60° C. and stirred for 1.5 hours to give a stable surfactant solution containing 0.7% by weight lignin amine and 1.3% by weight petroleum sulfonate.

Properties of Blends

As discussed above, stable solutions are obtained when the three components are combined in the proper proportions. A typical distribution of stable solutions is displayed in FIG. 1. The components represented by FIG. 1 are those described in Example 1—tallow amine, lignosulfonate and petroleum sulfonate. The total concentration of the surfactant blend is 2% (wt/wt) and each subdivision line in FIG. 1 represents 10% of the blend.

Thus, stable solutions were obtained for 0 to 15% amine (concentration of 0 to 0.3%), for 45 to 100% petroleum sulfonate (concentration of 0.9 to 2.0%) and for 0 to 50% lignosulfonate (concentration of 0 to 1.0%). Phase unstable systems can be used in EOR and therefore, although it is preferred, phase stability is not a requirement.

Phase stability in brine is only the first test of an enhanced oil recovery surfactant system. Once the ternary blends reported here pass this test, their activity was determined by an interfacial tension test. The interfacial tensions were determined on a spinning drop tensiometer (University of Texas) against a crude oil from Illinois. Low tension surfactant systems commonly have equilibrated interfacial tensions in the range of 1 to 100 millidynes/cm, and these so-called ultralow interfacial tensions are required for good oil recovery performance. Many of the stable blends shown in FIG. 1 also possess ultralow interfacial tensions. Table 2 shows several examples of formulations of tallow amine, Norlig 82 and TRS-40 which are potential enhanced oil recovery surfactants. The values reported in Table 2 are one hour interfacial tension measurements. For many blends, a one hour interfacial tension measurement is a sufficient indicator of probable utility as an EOR surfactant system. However, some systems with one hour interfacial tensions above 100 millidynes/cm also exhibit good enhanced oil recovery. The interfacial tensions of these systems are found to decrease as the system is allowed to equilibrate. Substantially all, if not all, systems useful in enhanced oil recovery have equilibrated interfacial tensions below about 100 millidynes/cm.

In practice, the interfacial tension measurements against the crude oil of interest will decline with respect to time until the crude oil/surfactant system combination is equilibrated at which time the interfacial tension should remain constant over time within experimental error. For example, the instructions for the University of Texas Spinning Drop Interfacial Tensiometer suggests that the system can be considered equilibrated when three consecutive hourly drop width readings agree to within about 0.001 cm.

TABLE 2

THE EFFECT OF SURFACTANT COMPOSITION ON INTERFACIAL TENSION

| % Amine | % Lignosulfonate | % Petroleum Sulfonate | IFT, Millidynes/cm |
|---|---|---|---|
| 0 | 0.6 | 1.4 | 126 |
| 0.1 | 0.5 | 1.4 | 4 |
| 0.2 | 0.4 | 1.4 | 10 |
| 0 | 0.7 | 1.3 | 106 |
| 0.1 | 0.6 | 1.3 | 6 |
| 0.175* | 0.525* | 1.3 | 30 |
| 0.1 | 0.0 | 1.9 | 158 |
| 0.1 | 0.9 | 1.0 | 99 |

*The lignin and amine in this surfactant were supplied as a preblended slurry (Example 2) rather than as separate components.

As Table 2 shows, mixtures which contain only lignosulfonate and petroleum sulfonate do not give ultralow interfacial tensions. However, the ternary blends, which contain the oil soluble amine, give ultralow interfacial tensions against the crude oil of interest. The entries in Table 2 are merely examples of a larger set of ultralow interfacial tensions and are not meant to cover the entire set. Seven hour interfacial tensions were measured for the last two entries of Table 2. The IFTs were found to have declined to 107 and 30 millidynes/cm respectively.

Use of Ternary Blends for Enhanced Oil Recovery

In addition to showing brine stability and the ability to lower interfacial tensions, the surfactant blends described above demonstrate excellent oil recovery ability in laboratory core floods.

A typical enhanced oil recovery operation utilizing these ternary blends would consist of injection of a surfactant system into the oil producing formation through injection wells. The system for a low tension chemical flood would normally range from about 1 to about 8% total surfactant and preferably from about 2 to about 4%.

The components of the ternary surfactant blend can be present in varying amounts. The preferred compositions include amine in the amount of about 1 to about 20%, the lignin in the amount up to about 70% and the water soluble anionic or non-ionic surfactant in the amount of about 30 to about 99%. Economic considerations suggest maximizing the amount of lignin. Therefore, at least 5% lignin is preferred and at least 10% is most preferred. Stable systems exhibiting ultra low IFTs and demonstrating enhanced oil recovery have been formulated with as much as about 90% lignin.

The exact concentration and ratio of the surfactant components which are useful depend on several factors including the particular brine and crude oil and the reservoir temperature. Blends for a particular reservoir will be optimized based on the conditions existing in that reservoir. Likewise, the choice of individual components will depend on the particular conditions and can be optimized utilizing well known techniques such as interfacial tension measurements and the coreflood tests described below.

In the case of a phase partitioning surfactant system, the concentration of surfactant blend will generally be higher, in the range of about 4 to 6%. The ratio of the components in the ternary surfactant blend will be in the same range as that for low tension floods. Generally, phase partitioning surfactant systems include a cosolvent such as an alcohol, amide, ester, ether, aldehyde, ketone, alkoxylated alcohol, sulfated or sulfonated alcohol and sulfated or sulfonated alkoxylated alcohol. Such cosolvents are usually $C_4$ to $C_6$ alkanols.

The volume of surfactant system slug injected is generally from about 0.01 to about 1.0 pore volumes. Again, the exact volume injected will be determined on a case by case determination based on reservoir conditions and concentration of the surfactant solution. Generally, the surfactant slug is followed by a solution of a mobility control agent such as a polysaccharide or a partially hydrolyzed polyacrylamide. The polymer solution drives the surfactant slug evenly through the formation. The oil mobilized by the surfactant slug is swept into the production wells where it is recovered.

The utility of these ternary blends in tertiary oil recovery was shown by a series of corefloods. In each of these corefloods, a Berea sandstone core ($2'' \times 2'' \times 12''$) was evacuated and saturated with brine. The brine composition was given in Table 1.

The core was then saturated with Illinois crude oil having a viscosity of 12 centipoise and a density of 0.86 g/ml. The oil saturation was reduced from about 0.68 to about 0.38 by waterflooding the core with the same brine. Chemical floods were performed using the surfactant systems discussed below. Each system was blended in 20% brine/80% fresh water, and each contained 0.12% of a partially hydrolyzed polyacrylamide (NalFlo 50, Nalco Chemical Company) as a viscosity enhancer. A surfactant slug equal to 0.25 pore volumes was injected in each coreflood. Each surfactant slug was followed by continuous injection of 0.15% NalFlo 50 in fresh water as a mobility control agent. The oil production was generally complete between 0.35 and 1.3 pore volumes of fluid injected. The percentage of waterflood residual oil recovered by the surfactant is called tertiary oil recovery.

The ternary blends disclosed here have proven to be very effective enhanced oil recovery surfactants. Their oil recovery potential parallels their IFT results shown in Table 2. As IFT decreases, oil recovery increases, and as was discussed above, the largest IFT decreases occur when a small amount of amine is added to the surfactant. Examples of oil recovery increases with blends of tallow amine, Norlig 82 and TRS-40 are shown in Table 3.

TABLE 3

TERTIARY OIL RECOVERY FOR TERNARY BLENDS AND COMPONENTS

| | Concentration, Wt. % Active | | | |
|---|---|---|---|---|
| | Amine | Lignosulfonate | Anionic Surfactant | Tertiary Recovery, % |
| 1. | — | — | 2.0 | 26 |
| 2. | 0.1 | — | 1.9 | 67 |
| 3. | — | 0.6 | 1.4 | 35 |
| 4. | 0.1 | 0.6 | 1.3 | 72 |
| 5. | 0.1 | 0.5 | 1.4 | 73 |
| 6. | 0.175* | 0.525* | 1.3 | 73 |

*See footnote in Table 2.

The water soluble petroleum sulfonate alone does not perform very well as an EOR surfactant (Coreflood #1.). It gives an oil recovery of only 26% in a one foot coreflood. Coreflood #2 was run with only a 5% substitution of amine for petroleum sulfonate. Even this small substitution level gave a dramatic oil recovery increase, to 67% from 26%. Coreflood #3 shows that the combination of petroleum sulfonate and lignosulfonate is a poor surfactant (35% oil recovery). However, this poor recovery can be improved by using only a 5% substitution of amine for either of the water soluble components (Corefloods #4 and #5). The 73% oil recovery shown by Coreflood #6 shows that a preblended lignin/amine concentrate gives equally good enhanced oil recovery performance to the surfactant systems made directly in brine.

Table 4 reports tertiary recovery and interfacial tensions for a variety of ternary blends utilizing different lignosulfonates. Each blend was prepared as described above. IFTs are one hour readings in millidynes/cm, and tertiary recovery values are in percent recovery for 0.25 pore volumes of surfactant followed by continuous polyacrylamide in fresh water. In each case the amine was tallow amine and the surfactant was TRS-40. The lignosulfonates used are identified below.

TABLE 4

| | Concentration, Wt. % Active | | | | |
|---|---|---|---|---|---|
| | Amine (Tallowamine) | Lignin | Anionic Surfactant (TRS-40) | IFT | Tertiary Recovery |
| 7. | .1 | .7A | 1.2 | 4 | 78.5 |
| 8. | .1 | .9B | 1.0 | 35 | 75. |
| 9. | .1 | .7C | 1.2 | 16 | 76. |
| 10. | .1 | .7D | 1.2 | 3 | 76. |
| 11. | .1 | .8E | 1.1 | 85 | 77. |
| 12. | .1 | .6A | 1.3 | 4 | 75. |
| 13. | .1 | .6F | 1.3 | — | 82. |
| 14. | .1 | .6G | 1.2 | 100 | 65. |
| 15. | .1 | .6H | 1.3 | 8 | 61. |
| 16. | .1 | .6I | 1.3 | 68 | 73.4 |

A - Marasperse 92
B - low molecular weight lignosulfonate prepared by alkaline sulfite cook of Norlig 82
C - low molecular weight lignosulfonate prepared by alkaline cook of Norlig 82
D - sulfomethylated low molecular weight lignosulfonate derived from alkaline sulfite cook of Norlig 82
E - sulfomethylated low molecular weight lignosulfonate derived from alkaline sulfite cook of Marasperse 92
F - high molecular weight fraction from physical separation of Marasperse 92
G - low molecular weight fraction from physical separation of Marasperse 92
H - low molecular weight fraction from physical separation of Norlig 82
I - Lignosol X
J - Norlig 82

Table 5 reports tertiary recovery and interfacial tension data for ternary blends utilizing different lignosulfonates. The amine utilized is tallow amine and the surfactant is Conoco CN5, a mixed alkylbenzene sulfonate. The lignosulfonate designations are the same as above. The blends were prepared in 40% Illinois well supply water/60% Illinois fresh water. Other conditions were as above.

TABLE 5

| | Concentration, Wt. % Active | | | | |
|---|---|---|---|---|---|
| | Amine (Tallowamine) | Lignin | Anionic Surfactant (CN-5) | IFT | Tertiary Recovery |
| 17. | .2 | .4F | 1.4 | 422 | 78.6 |
| 18. | .3 | .4I | 1.3 | 56 | 80.4 |
| 19. | .3 | .4A | 1.3 | 8 | 76.1 |

Table 6 reports tertiary recovery and interfacial tension data for ternary blends utilizing different amines. The blends were prepared in 20% well supply water/80% fresh water (Illinois). The lignin utilized is Norlig 82 and the surfactant is TRS-40. The amines are identified below.

TABLE 6

| | Concentration, Wt. % Active | | | | |
|---|---|---|---|---|---|
| | Amine | Lignin (Norlig 82) | Surfactant | IFT | Tertiary Recovery |
| 20. | .05M | .6 | 1.35 | 4 | 71.8 |

TABLE 6-continued

| | Concentration, Wt. % Active | | | | |
|---|---|---|---|---|---|
| | Amine | Lignin (Norlig 82) | Surfactant | IFT | Tertiary Recovery |
| 21. | .1N | .2 | 1.7 | 80 | — |
| 22. | .2P | .2 | 1.6 | 8 | 72.7 |
| 23. | .05Q | 1.42 | 1.94 (1.5% PMA) | 21 | — |
| 24. | .1R | .8 | 1.1 | 4 | 75. |
| 25. | .1S | .5 | 1.4 | 9 | 75. |
| 26. | .1T | .6 | 1.3 | 6 | 72. |

M - octyl amine
N - dimethyl tallow amine
P - dimethyl ditallow amine
Q - tritallow amine
R - tall oil amine
S - dodecyl amine
T - tallow amine Table 7 reports tertiary recovery and interfacial tension data for ternary blends utilizing different anionic surfactants. The amine utilized was tallow amine and the lignosulfonates were Norlig 82 (J) and Lignosol X (I). The anionic surfactants are identified below. Except as noted, the blends were prepared in 20% well supply water/80% fresh water (Illinois). Other conditions were as above.

TABLE 7

| | Concentration, Wt. % Active | | | | |
|---|---|---|---|---|---|
| | Amine (Tallowamine) | Lignin | Surfactant | IFT | Tertiary Recovery |
| 27. | .2* | .9I | .9AA | 34 | 68. |
| 28. | .1 | .7I | 1.2AA | 395 | 68. |
| 29. | .1* | .7I | 1.2BB | 315 | 49.6 |
| 30. | .1 | .7I | 1.2CC | 297 | 29.5 |
| 31. | .1 | .6I | 1.3DD | 68 | 73.4 |
| 32. | .1 | .6J | 1.3DD | 6 | 72. |
| 33. | .1 | .1J | 1.8EE | 35 | — |
| 34. | .1 | .3J | 1.6FF | 40 | — |
| 35. | .1 | .8J | 1.1GG | 48 | 60. |
| 36. | .2 | .1J | 1.7HH | 99 | — |
| 37. | .2* | .4I | 1.4JJ | 17 | 67.7 |
| 38. | .1* | .2I | 1.7KK | 8 | — |
| 39. | .1 | .2I | 1.7LL | 7 | — |
| 40. | .1* | .2I | 1.4MM | 9 | 66.2 |
| 41. | .1 | .4I | 1.5MM | 252 | 66.7 |
| 42. | .3 | .4I | 1.3NN | 1034 | 80.1 |
| 43. | .3* | .4I | 1.3NN | 56 | 80.4 |
| 44. | .3** | .4I | 1.3NN | 66 | 82.4 |

*40% well supply water/60% fresh water (Illinois)
**60% well supply water/40% fresh water (Illinois)
AA - Conoco C-550, alkyl benzene sulfonate
BB - GAF Alipal CO-436 - alkylphenol ethoxy sulfate
CC - Stepan Polystep B-1 alkylphenol ethoxy sulfate
DD - TRS 40
EE - Stepan Petrostep 360 - petroleum sulfonate (e.g. wt. = 360)
FF - Nekal BX-78, alkylnaphthalene sulfonate
GG - proprietary petroleum sulfonate (eq. wt. = 312)
HH - proprietary petroleum sulfonate (eq. wt. = 359)
JJ - proprietary petroleum sulfonate (eq. wt. = 315)
KK - proprietary petroleum sulfonate (eq. wt. = 395)
LL - proprietary petroleum sulfonate (eq. wt. = 394)
MM - proprietary petroleum sulfonate (eq. wt. = 352)
NN - Conoco CN-5, alkylbenzene sulfonate The above data demonstrates the utility of ternary blends over a range of individual ingredients. A variety of lignosulfonates including modified lignosulfonates are shown to exhibit superior results to binary blends of lignin/amine, lignin/anionic surfactant, and amine/anionic surfactant. Similar superior results are demonstrated for a number of anionic surfactants and amines.

The data also demonstrates the relationship between low interfacial tensions and good tertiary recovery. Instances of good tertiary recovery from systems with high interfacial tensions are believed to result from non-equilibrated IFT measurements. In other words, the equilibrated IFT for a system such as coreflood 17 reported in Table 5 would be expected to be much lower than 422 and most likely would be less than 100.

The foregoing description has been directed to particular embodiments of the invention for the purposes of illustration and explanation. Those skilled in the art will readily appreciate modifications and changes in the compositions and procedures set forth without departing from the scope and spirit of the invention. Applicants' intent is that the following claims be interpreted to embrace all such modifications and variations.

What is claimed is:

1. A method for the enhanced recovery of oil from a subterranean formation containing oil and having at least one production well and at least one injection well comprising:
   injecting into said formation a surfactant system comprising
   a surfactant blend comprising an oil soluble primary alkyl amine having from 8 to 22 carbon atoms, a lignin selected from the group consisting of lignosulfonates and sulfonated alkali and soda lignins and a water soluble anionic surfactant selected from the group consisting of petroleum sulfonates and alkylaryl surfonates, said blend having from about 1 to about 20% of said oil soluble amine, from about 5% to about 70% of said lignin, and from about 10 to about 99% of said water soluble anionic surfactant; and
   water, wherein the equilibrated interfacial tension between said oil and said surfactant system is less than about 100 millidynes/cm;
   driving said surfactant system through said formation; and
   producing the oil mobilized by said surfactant system through said production well.

2. The method of claim 1 wherein the concentration of said blend in said surfactant system is from about 1 to about 8%.

3. The method of claim 1 wherein said water soluble surfactant is present in an amount from about 30 to about 99%.

4. The method of claim 3 wherein said lignin is present in an amount from about 10% to about 70%.

5. The method of claim 4 wherein said amine is a primary fatty amine having from 16 to 22 carbon atoms.

6. The method of claim 5 wherein said anionic surfactant is a petroleum sulfonate.

7. The method of claim 4 wherein said surfactant system further includes a cosolvent.

8. A surfactant composition useful for the enhanced recovery of oil from a subterranean formation containing oil comprising;
   an oil soluble primary alkyl amine having from 8 to 22 carbon atoms;
   a lignin selected from the group consisting of lignosulfonates and sulfonated alkali and soda lignins; and
   a water soluble anionic surfactant selected from the group consisting of petroleum sulfonates and alkylaryl surfonates,
   wherein said oil soluble amine is present in the amount of about 1% to about 20%, said lignin is present in the amount of about 5% to about 70% and said anionic surfactant is present in the amount of about 30% to about 99%, each based on the total surfactant present, and wherein when said composition is added to water to form a surfactant system the equilibrated interfacial tension between said system and said oil will be less than about 100 millidynes/cm.

9. The composition of claim 8 wherein said amine is a primary fatty amine having from 16 to 22 carbon atoms.

10. The composition of claim 9 wherein said anionic surfactant is a petroleum sulfonate.

11. A surfactant composition useful for the enhanced recover of oil from a subterranean formation containing oil comprising:
   a primary fatty amine having from 16 to 22 carbon atoms;
   a lignosulfonate; and
   a water soluble anionic surfactant selected from the group consisting of petroleum sulfonates and alkylaryl sulfonates,
   wherein said amine is present in the amount of about 1% to about 20%, the lignosulfonate is present in the amount of about 10% to about 70% and the anionic surfactant is present in the amount of about 30% to about 99%, each based on the total surfactant present, and wherein when said composition is added to water to form a surfactant system the equilibrated interfacial tension between said system and said oil will be less than about 100 millidynes/cm.

12. The composition of claim 11 wherein said anionic surfactant is a petroleum sulfonate.

13. A method for the enhanced recovery of oil from a subterranean formation containing oil and having at least one production well and at least one injection well comprising:
   injecting into said formation a surfactant system comprising:
   a surfactant blend comprising a primary fatty amine having from 16 to 22 carbon atoms, a lignosulfonate and a water soluble petroleum sulfonate and comprising about 1 to about 8% of said surfactant system, said blend having from about 1 to about 20% of said primary fatty amine, from about 5% to about 70% of said lignosulfonate, and from about 30 to about 99% of said water soluble petroleum sulfonate, and
   water, wherein the equilibrated interfacial tension between said oil and said surfactant system is less than about 100 millidynes/cm;
   driving said surfactant system through said formation; and
   producing the oil mobilized by said surfactant system through said production well.

14. The method of claim 13 wherein said lignosulfonate is present in an amount of about 10% to about 70%.

15. The method of claim 14 wherein said surfactant system further includes a cosolvent.

* * * * *